US010495747B2

(12) United States Patent
Aoki et al.

(10) Patent No.: US 10,495,747 B2
(45) Date of Patent: Dec. 3, 2019

(54) SNOW QUALITY MEASURING APPARATUS AND SNOW QUALITY MEASURING METHOD

(71) Applicant: TAIYO YUDEN CO., LTD., Tokyo (JP)

(72) Inventors: Yutaka Aoki, Tokyo (JP); Ryuichi Sunagawa, Tokyo (JP); Jin Mikata, Tokyo (JP); Ryuji Murata, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 337 days.

(21) Appl. No.: 15/380,986

(22) Filed: Dec. 15, 2016

(65) Prior Publication Data

US 2017/0176587 A1    Jun. 22, 2017

(30) Foreign Application Priority Data

Dec. 16, 2015  (JP) .................................. 2015-244797

(51) Int. Cl.
*G01S 13/88* (2006.01)
*H01Q 15/14* (2006.01)
*G01S 13/34* (2006.01)

(52) U.S. Cl.
CPC ............ *G01S 13/88* (2013.01); *G01S 13/885* (2013.01); *H01Q 15/14* (2013.01); *G01S 13/34* (2013.01)

(58) Field of Classification Search
CPC .............................. G01S 13/885; H01Q 15/14
See application file for complete search history.

(56) References Cited

U.S. PATENT DOCUMENTS

| 3,801,779 | A | * | 4/1974 | Ver Sluis | ................ | G01W 1/14 |
| | | | | | | 250/222.1 |
| 4,992,667 | A | * | 2/1991 | Abelentsev | ............ | G01N 23/09 |
| | | | | | | 250/358.1 |
| 5,594,250 | A | * | 1/1997 | Condreva | ............... | G01T 1/178 |
| | | | | | | 250/361 R |
| 5,864,059 | A | * | 1/1999 | Sturm | ...................... | G01B 5/06 |
| | | | | | | 73/432.1 |
| 6,621,448 | B1 | * | 9/2003 | Lasky | ...................... | G01V 3/12 |
| | | | | | | 342/118 |
| 7,924,216 | B2 | * | 4/2011 | Delin | ..................... | G01F 23/284 |
| | | | | | | 342/124 |

(Continued)

FOREIGN PATENT DOCUMENTS

| JP | H6-66957 A | 3/1994 |
| JP | H6-317677 A | 11/1994 |
| JP | 2003-75369 A | 3/2003 |

*Primary Examiner* — Marcus E Windrich
(74) *Attorney, Agent, or Firm* — Chen Yoshimura LLP

(57) ABSTRACT

A snow quality measuring apparatus according to one aspect of the present invention includes a plurality of reflectors, at least one transmitter, at least one receiver, and a measuring device. The plurality of reflectors are respectively arranged at a plurality of prescribed heights above the ground. The transmitter emits radio waves towards the plurality of reflectors, and the receiver receives the reflected waves of the radio waves from the plurality of reflectors. The measuring device measures snow quality of snow on the ground at the prescribed plurality of heights based on the respective reflected waves to from the plurality of reflectors as received by the receiver.

9 Claims, 8 Drawing Sheets

(56) References Cited

U.S. PATENT DOCUMENTS

| | | | |
|---|---|---|---|
| 8,018,373 B2* | 9/2011 | Edvardsson | G01F 23/284 |
| | | | 342/118 |
| 8,963,769 B2* | 2/2015 | Linden | G01F 23/284 |
| | | | 342/124 |
| 2011/0219868 A1* | 9/2011 | Lane | G01F 23/2921 |
| | | | 73/170.21 |
| 2014/0208844 A1* | 7/2014 | Bae | G01W 1/14 |
| | | | 73/170.21 |
| 2014/0366648 A1* | 12/2014 | Christian | G01B 21/18 |
| | | | 73/862.621 |

* cited by examiner

SNOW QUALITY MEASURING APPARATUS AND SNOW QUALITY MEASURING METHOD

BACKGROUND OF THE INVENTION

Technical Field

The present invention relates to a snow quality measuring apparatus and a method of measuring snow quality of snow on the ground using millimeter radio waves, for example.

Background Art

One type of natural disaster is that which is caused by snow. Namely, avalanches, roof collapses, etc. cause tremendous damage, and the effect on transportation systems such as railways or roads in cities represents a serious issue on a societal scale. As a countermeasure, ordinary information regarding snow typically involves snowfall amount, temperature, and wind direction, with predictions or the like being derived from these by using surface melting predictions or snow quality change estimation models based on solar radiation amount, snow density, etc.; however, these predictions require a vast amount of data and numerical analysis for each locality and are unsuitable for use with avalanches or extensive areas, for example.

Meanwhile, a technique has been proposed whereby a probe is inserted into the snow to measure snow quality in the depth direction and then ultrasonic waves or radio waves are emitted to the surface of the snow in order to measure or estimate the quality, depth, etc. of the snow on the ground (see Patent Documents 1 to 3, for example).

RELATED ART DOCUMENTS

Patent Documents

Patent Document 1: Japanese Patent Application Laid-Open Publication No. H6-66957
Patent Document 2: Japanese Patent Application Laid-Open Publication No. H6-317677
Patent Document 3: Japanese Patent Application Laid-Open Publication No. 2003-75369

SUMMARY OF THE INVENTION

The technique described in Patent Document 1 inserts a probe into a layer of snow to identify the snow quality within the snow on the ground, but requires someone to go to the measurement location and perform manual work, and is thus incapable of unmanned automatic measurement. Furthermore, the technique described in Patent Document 2 uses ultrasonic waves to measure snow depth, but does not allow one to know the state inside the snow on the ground, and thus cannot detect snow quality. Moreover, the technique described in Patent Document 3, in order to identify snow quality, measures the permittivity of snow on the ground by receiving reflected waves of radio waves emitted towards a reflector disposed at the base of the snow (on the ground), but this can only identify snow quality as an average of total snow and has difficulty in identifying changes in snow quality in the depth direction.

In view of the above-mentioned issues, an aim of the present invention is to provide a snow quality measuring apparatus and snow quality measuring method that allows unmanned measurement of snow quality for each layer of snow on the ground in the depth direction. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a snow quality measuring apparatus, including: a plurality of reflectors respectively installed at a plurality of prescribed heights from the ground; at least one transmitter emitting radio waves toward the plurality of reflectors; at least one receiver receiving reflected waves of the radio waves from the plurality of reflectors; and a measuring device measuring snow quality for snow on the ground at multiple heights based on the respective reflected waves from two or more of the plurality of reflectors that are buried in the snow as received by the receiver.

The snow quality measuring apparatus includes a plurality of reflectors respectively arranged at a plurality of prescribed height positions above the ground, and thus it is possible to perform unmanned measurement of snow quality for each layer of snow where the respective reflectors are disposed based on the reflected waves of the radio waves from the respective reflectors inside the snow on the ground.

The measuring device may measure the snow quality at the multiple heights based on an amount of delay in a return time of the respective reflected waves from the two or more of the plurality of reflectors when there is snow on the ground, relative to the return time when there is no snow on the ground.

The electrical distance of the respective reflected waves from the plurality of reflectors changes depending on the amount of snow on the ground and snow quality, and the amount of this change manifests itself in the amount of delay in the return time of the respective reflected waves to the transceivers. The amount of delay is closely correlated to the permittivity of the snow covering the respective reflectors, and thus it is possible to identify the quality of the snow on the respective reflectors from the amount of delay.

Various modifications are possible for the configuration of the transmitter and receiver, and the positional relationship of the transmitter and receiver to the respective reflectors. For example, the at least one transmitter may be a single transmitter installed facing the ground and simultaneously emitting the radio waves to the plurality of reflectors, and the at least one receiver may be a single receiver receiving all of the reflected waves of the radio waves from the plurality of reflectors.

In such case, the plurality of reflectors may include a first reflector installed on the ground, and the measuring device may measure a depth of the snow on the ground based on a return time of the reflected waves from a surface of the snow on the ground, relative to a return time of the reflected waves from the first reflector when there is no snow on the ground.

Alternatively, the at least one transmitter may be a plurality of transmitters respectively installed at the plurality of prescribed heights, each emitting the radio waves to the corresponding reflector, and the at least one receiver may be a plurality of receivers each receiving the reflected waves of the radio waves from the corresponding reflector.

In another aspect, the present disclosure provides a method of measuring snow quality, including: emitting radio waves toward a plurality of reflectors respectively installed at a plurality of prescribed heights from the ground; receiving reflected radio waves of the radio waves from two or more of the plurality of reflectors that are buried in snow on the ground; and measuring snow quality for the snow on the ground at multiple heights based on the received respective reflected waves from the two or more of the plurality of reflectors.

As described above, the present invention makes it possible to perform unmanned measurement of snow quality for each layer of snow on the ground in the depth direction. It is to be understood that both the foregoing general description and the following detailed description are exemplary and explanatory, and are intended to provide further explanation of the invention as claimed.

DETAILED DESCRIPTION OF EMBODIMENTS

Embodiments of the present invention will be described below with reference to the drawings.

(Embodiment 1)

Figure 1:
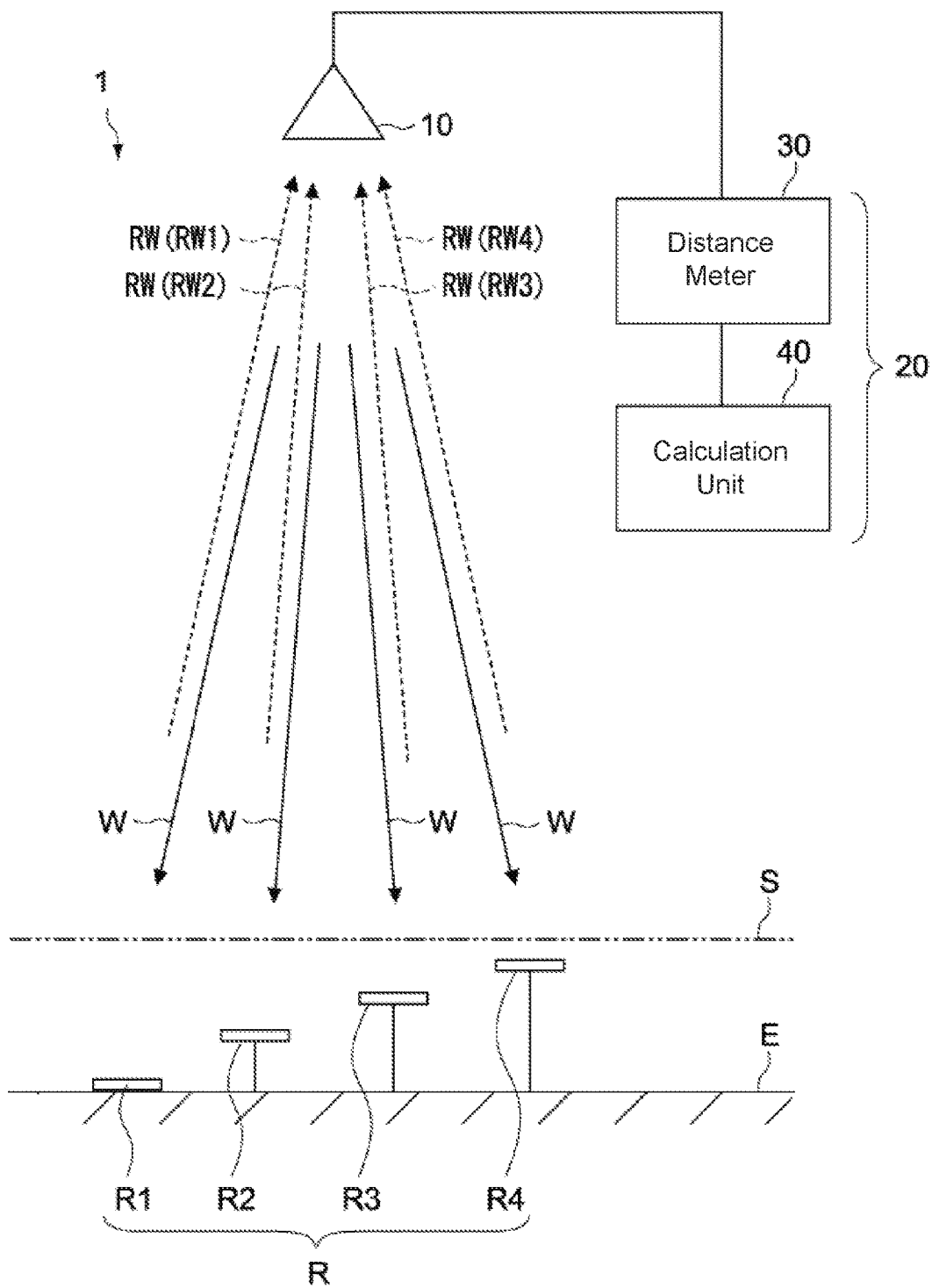
FIG. 1 is a schematic configuration diagram of a snow quality measuring apparatus according to Embodiment 1 of the present invention.

FIG. 1 is a schematic configuration diagram of a snow quality measuring apparatus according to Embodiment 1 of the present invention.

(Snow Quality Measuring Apparatus)

A snow quality measuring apparatus 1 of the present embodiment is typically installed in mountainous areas, plains, or other locations that receive a lot of snow, and can perform unmanned measurement of depth, quality, etc. of the snow that has accumulated on the ground.

The snow quality measuring apparatus 1 includes a plurality of reflectors R1, R2, . . . (hereinafter collectively referred to as reflectors R unless being individually explained), an antenna 10 (transceiver), and a measuring device 20.

The plurality of reflectors R are respectively arranged at a plurality of prescribed heights above the ground E. FIG. 1 shows four reflectors R1 to R4 that have been installed in locations with mutually differing heights above the ground E. The first to fourth reflectors R1 to R4 are arranged at sequentially higher locations, with the first reflector R1 in the lowest location (ground) and the fourth reflector R4 at the highest location.

The amount of reflectors is not limited to four, and may be two, three, or five or more instead. Furthermore, the differences in height among the respective reflectors has no limitations, and can be set to 50 cm or below, for example. The higher the amount of reflectors, and the smaller the differences in height among the reflectors, the higher that the measuring resolution of snow quality can be set.

The antenna 10 emits radio waves W used for measurement towards the plurality of reflectors R and can receive reflected waves RW of these radio waves from the plurality of reflectors R. The antenna 10 of the present embodiment is constituted by a single transceiver disposed in the air and typically includes a single transmitter and a single receiver. The radio waves W used for measurement are typically millimeter waves, but the present invention is not limited to this, and radio waves in other wavelength bands that have transmissive characteristics with respect to snow on the ground may be used instead.

Figure 2:
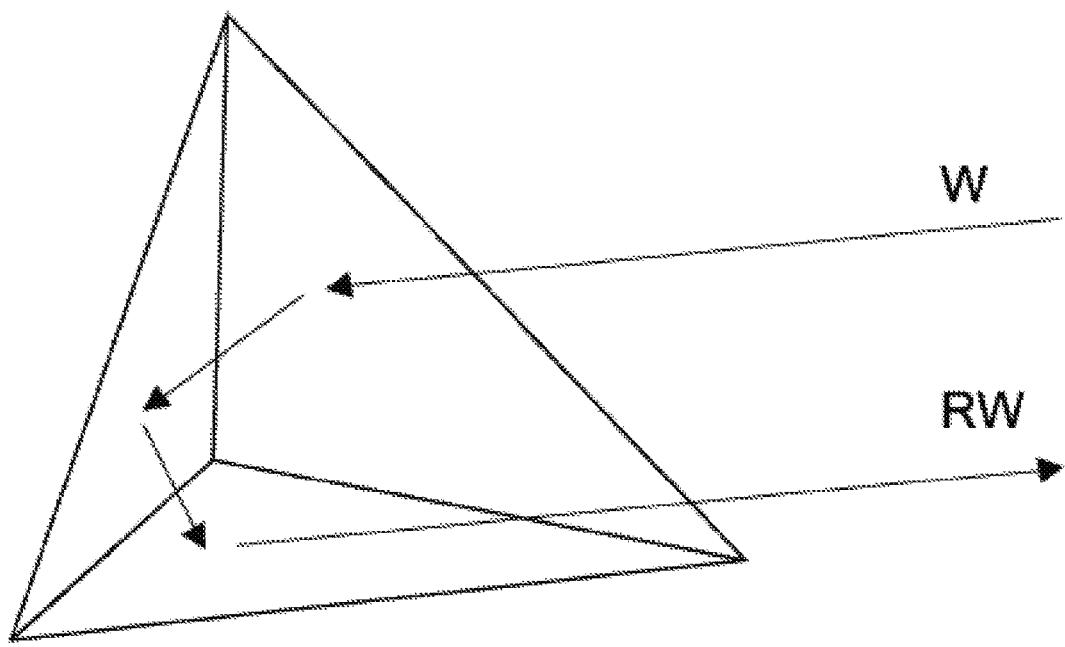
FIG. 2 is a schematic view of one configuration example of a reflector in the snow quality measuring apparatus.

The antenna 10 is in the air above the installation region of the reflectors R1 to R4 at a height allowing for emission of the radio waves W to the respective reflectors R1 to R4 and reception of the reflected waves RW (RW1 to RW4) from the respective reflectors R1 to R4. It is preferable that each of the reflectors R1 to R4 have a structure exhibiting reflective characteristics (retroreflective characteristics) that makes it possible to reflect the radio waves W to the antenna 10. As shown in FIG. 2, for example, a configuration constituted by three isosceles right triangle-shaped metal plates combined together can be adopted as such a structure. This makes it possible for the radio waves W to be reflected back towards the incident direction thereof in an antiparallel direction.

The antenna 10 emits the radio waves W to the respective reflectors R1 to R4 at the same time. The radio waves W emitted from the antenna 10 are reflected by the respective reflectors R1 to R4 and the reflected waves RW1 to RW4 thereof are received by the same antenna 10. The location of the antenna 10 is fixed, and thus the reflected waves from the reflectors reach the antenna 10 in order of reflectors closest to the antenna 10. In the example shown in FIG. 1, the order of reception by the antenna 10 is: the reflected wave RW4 from the fourth reflector R4, the reflected wave RW3 from the third reflector R3, the reflected wave RW2 from the second reflector R2, and the reflected wave RW1 from the first reflector R1.

Based on the respective reflected waves RW from the plurality of reflectors R received by the antenna 10, the measuring device 20 measures snow quality of the snow S on the ground E at the plurality of prescribed height positions (the height positions where the reflectors R1 to R4 are arranged). Furthermore, the measurement device 20 in the present embodiment can measure the depth of the snow S (snow depth) based on the reflected waves of the radio waves W from the surface of the snow S.

Figure 3:
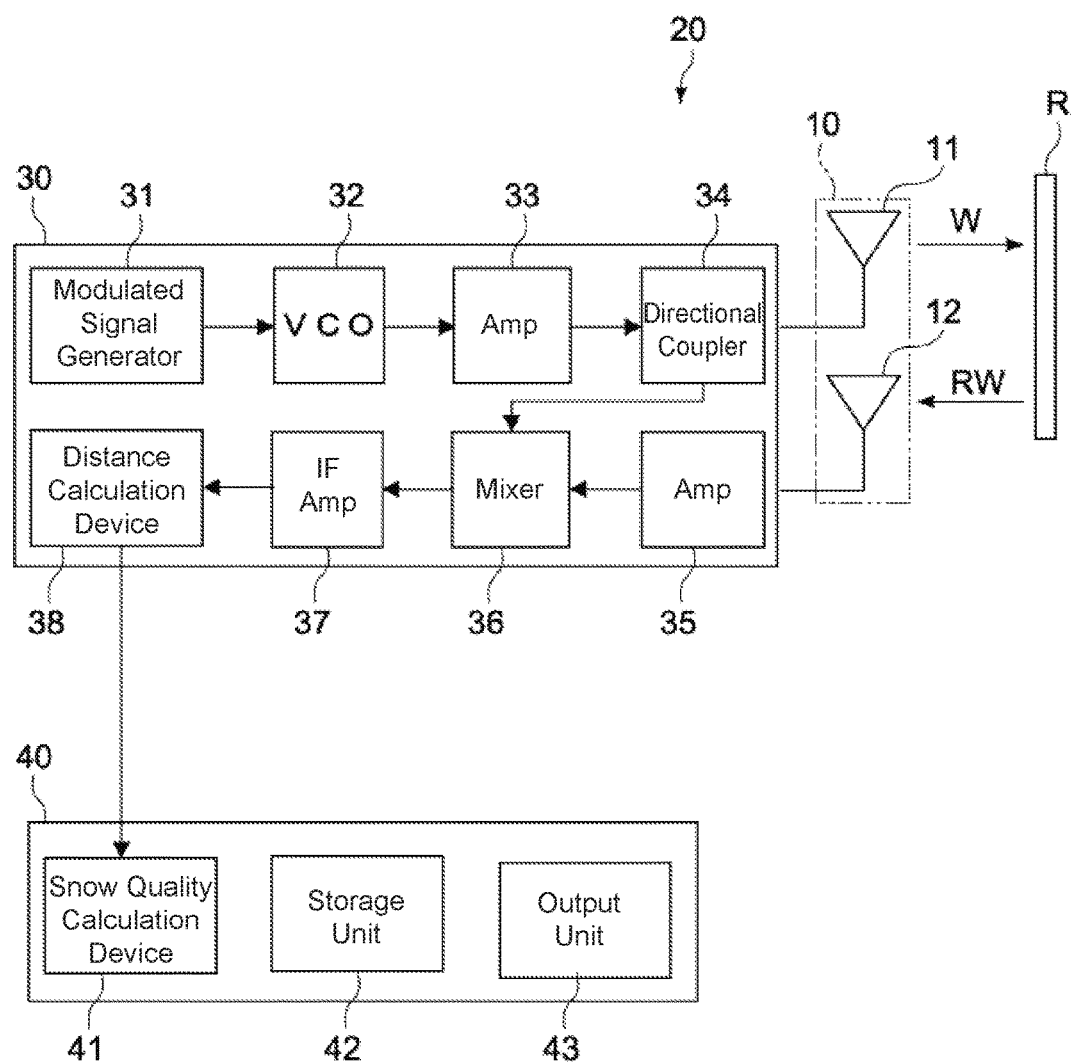
FIG. 3 is a block diagram showing one configuration example of a measuring device in the snow quality measuring apparatus.

The measuring device 20 includes a distance meter 30 and a calculation unit 40. FIG. 3 is a block diagram showing a configuration example of the measuring device 20.

The distance meter 30 measures the electrical distance between the antenna 10 and the respective reflectors R1 to R4 based on the reflected waves RW1 to RW4 from the respective reflectors R1 to R4 received by the antenna 10. The distance meter 30 is typically constituted by an electric wave distance meter (radar).

The distance meter 30 includes a modulated signal generator 31, a VCO (voltage-controlled oscillator) 32, amps 33 and 35, a directional coupler 34, a mixer 36, an IF amp 37, and a distance calculation device 38.

The modulated signals from the modulated signal generator 31 are transmitted to the VCO 32, and high-frequency signals of a prescribed frequency (30 GHz, for example) are output from the VCO 32. The high-frequency signals output from the VCO 32 are amplified to the necessary level for transmission output by the amp 33 and transmitted via the directional coupler 34 to the transmitter 11 of the antenna 10. This emits radio waves W used for measurement to the plurality of reflectors R, and the reflected waves RW thereof are received by the receiver 12 of the antenna 10.

The amp 35 amplifies and transmits the reflected waves RW received by the receiver 12 to the mixer 36. The mixer 36 uses some of the transmission signals output from the coupling port of the directional coupler 34 to convert the frequency of the output signals of the amp 35, and outputs IF signals. The IF signals are amplified by the IF amp 37 and transmitted to the distance calculation device 38. The distance calculation device 38 calculates the electrical distance between the antenna 10 and the respective reflectors R1 to R4 based on the reflected waves RW1 to RW4 from the respective reflectors R1 to R4.

The calculation unit 40 includes a snow quality calculation device 41, a storage unit 42, and an output unit 43. The calculation unit 40 is typically constituted by a computer.

The snow quality calculation device 41 calculates snow quality of the snow S on the ground E at the prescribed plurality of height positions where the plurality of reflectors R are arranged. The storage unit 43 stores calculation programs, various parameters, etc. that are necessary for calculation by the snow quality calculation device 41. The calculation programs include programs for calculating properties relating to the permittivity of snow S based on the electrical distances among the respective reflected waves RW as calculated by the distance calculation device 38. The parameters include the height positions where the respective reflectors R1 to R4 are arranged, tables expressing correlations between permittivity and snow quality, and the like.

The output unit 43 outputs information relating to snow quality as calculated by the snow quality calculation device 41. Examples of the output unit 43 include a communication unit that wirelessly or wiredly transmits to a display unit or external device.

The distance meter 30 and calculation unit 40 may be constituted by the same hardware or may be constituted by different hardware. If the latter, the distance meter 30 and calculation unit 40 are electrically connected by wires or wirelessly. In such a case, the calculation unit 40 can be arranged in a location that is different from the location where the antenna 10, distance meter 30, etc. are arranged.

(Snow Quality Measuring Method)

The snow quality measuring apparatus 1 emits radio waves W to the plurality of reflectors R buried in the snow and respectively arranged at the plurality of prescribed height positions from the ground E, receives the reflected waves RW of the radio waves from the plurality of reflectors R, and based on the received reflected waves RW measures the snow quality of the snow on the ground E at the prescribed plurality of height positions.

Below, with reference to FIGS. 4A, 4B, and 5, the principles of snow quality measuring will be explained.

Figure 4A:
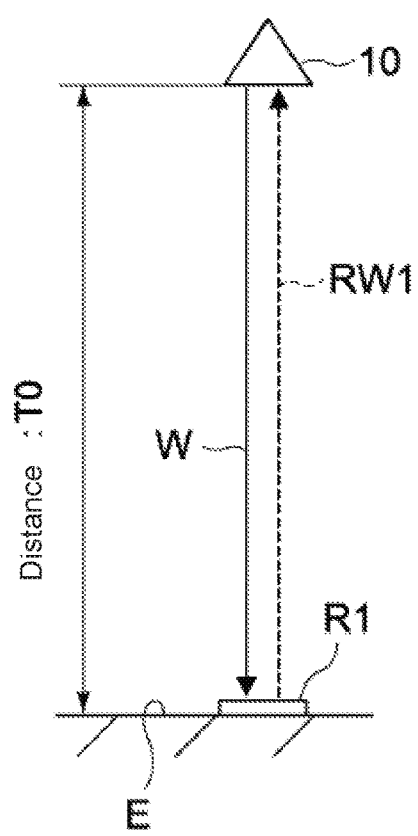
FIGS. 4A and B are schematic views for explaining measurement principles of the snow quality measuring apparatus.

FIG. 4A is a schematic diagram showing a relationship between the reflector R1 on the ground E and antenna 10 when there is no snow. As shown in FIG. 4A, when the distance between the reflector R1 and antenna 10 is T0(m), and the time it takes for a radio wave W from the antenna 10 to be emitted and then the reflected wave RW1 thereof to return to the antenna 10 via the reflector R1 is t0(s), and when the speed of the radio waves W and RW1 is c(m/s) (speed of light), then time t0 is expressed as follows:

$$t0 = 2T0/c \qquad (1).$$

Figure 4B:
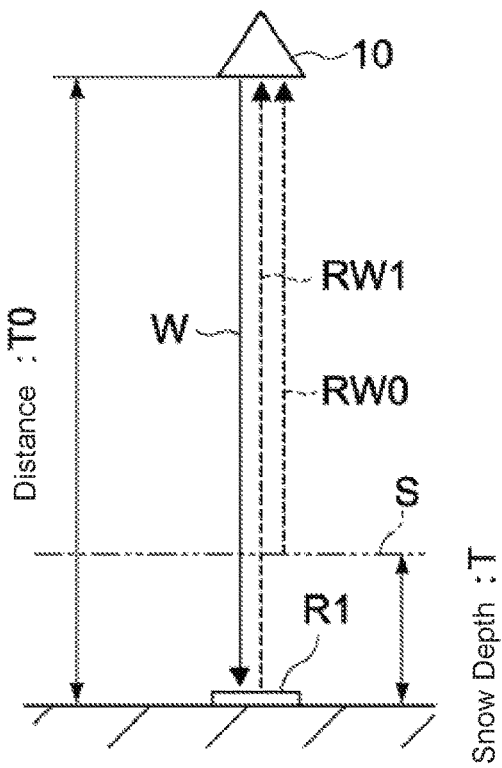

Meanwhile, as shown in FIG. 4B, when snow S of depth T is on the ground E, first, it is possible to find snow depth T(m) by primary reflected wave RW0 of a radio wave W from the snow S surface. Moreover, when the average relative permittivity of the snow S is ε and the speed of the radio wave going through the snow is $c/\sqrt{\varepsilon}$, then the round-trip time t1(s) of the radio wave W (RW1) that has passed through the snow S and been reflected by the reflector R1 is expressed as follows:

$$t1 = 2\{T0 + T(\sqrt{\varepsilon} - 1)\}/c \qquad (2).$$

Accordingly, the relative permittivity ε of the snow is expressed as follows:

$$\varepsilon = \{(c \times t1 - 2T0)/2T + 1\}^2 \qquad (3).$$

It is known that relative permittivity ε changes based on the makeup and properties of the snow, with feathery or large-snowflake snow having a relative permittivity of 1.2, moist snow 1.3, wet snow 1.6 to 1.9, and slush 2.4 to 14.4 (source: Antenna Engineering Handbook (Second Edition), The Institute of Electronics, Information and Communication Engineers). Accordingly, formula (3) allows the estimation of snow quality by calculating the relative permittivity of the snow that is targeted for measurement.

Next, a method of measuring snow quality using the plurality of reflectors R1 to R4 will be explained with reference to FIGS. 5 and 6. FIG. 5 is a schematic diagram showing the plurality of reflectors R1 to R4 buried in the snow S, and FIG. 6 is a schematic diagram showing the reflected waves from the snow surface and respective reflectors R1 to R4 as received by the antenna 10.

In general, the quality of snow on the ground varies greatly depending on atmospheric conditions during snowfall or afterwards, such as temperature, humidity, wind strength, and the like. In particular, the deeper the snow is, the more that the snow closest to the ground is being compressed by the snow piled above it, thus causing the snow closest to the ground to be dense and susceptible to freezing. In this manner, it could be said that the snow S is constituted by a plurality of layers of differing snow quality stacked together.

Figure 5:
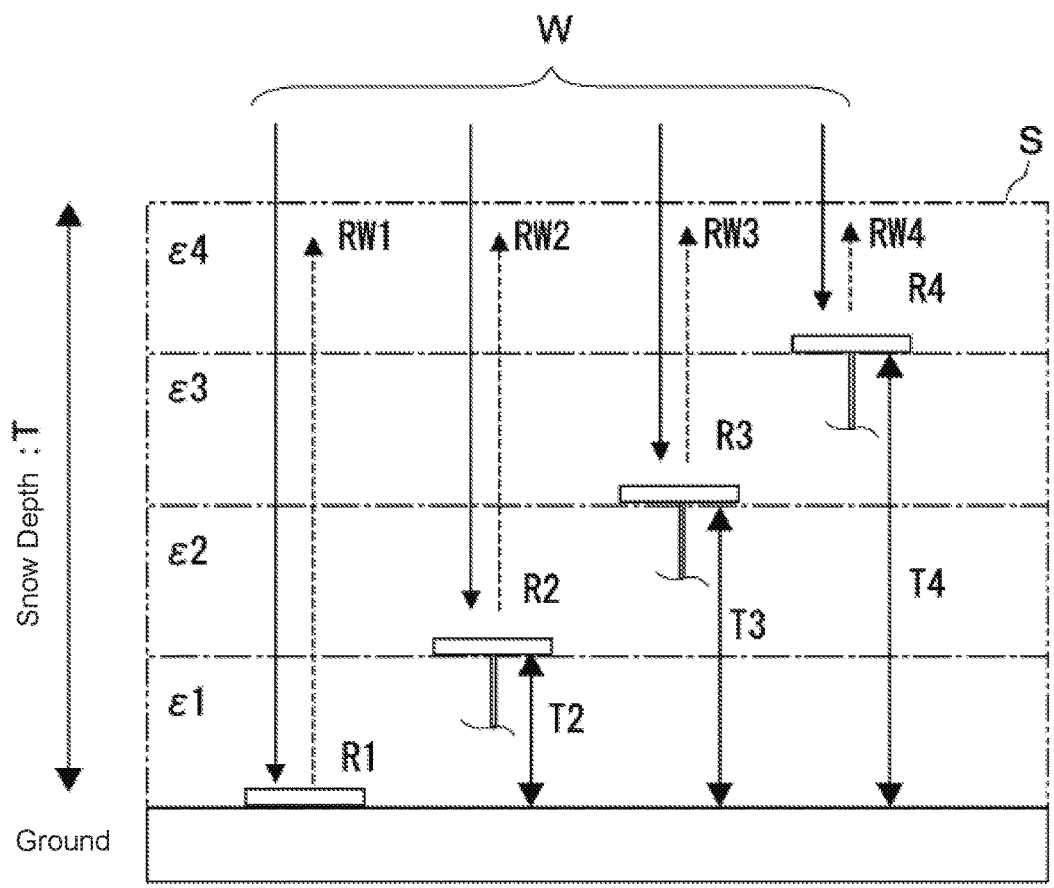
FIG. 5 is a schematic view for explaining a snow quality measuring method for each layer of snow on the ground using a plurality of reflectors.

In regard to this, in the present embodiment, as shown in FIG. 5, the plurality of reflectors R1 to R4 are arranged at differing height positions above the ground, and the snow quality (specifically, the relative permittivity ε) of the snow layers at the height positions of the respective reflectors R1 to R4 is calculated based on the reflected waves RW1 to RW4 of the respective reflectors R1 to R4.

Figure 6:
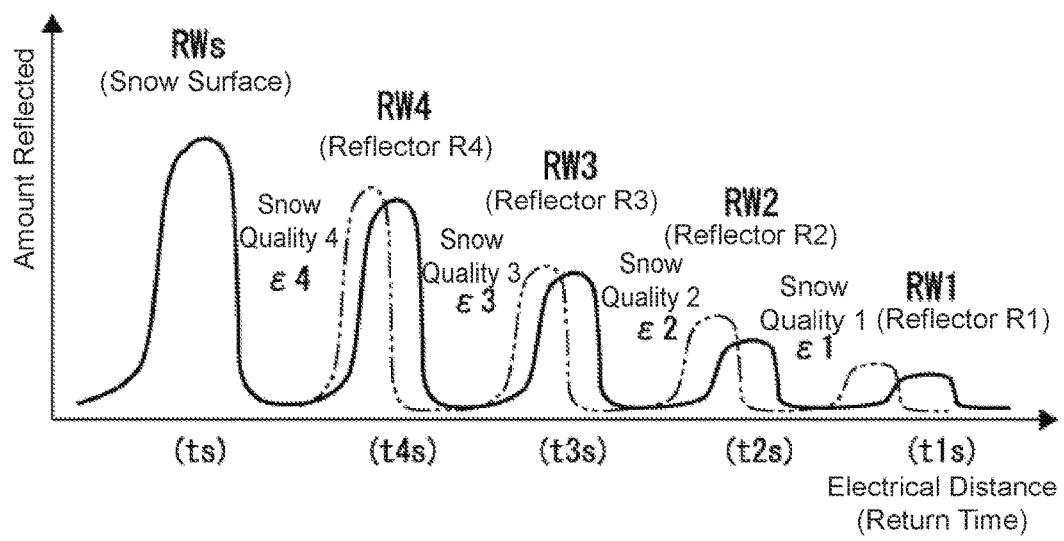
FIG. 6 is a schematic view for explaining a reception example of each of the reflected waves from the plurality of reflectors.

For example, as shown by the bold line in FIG. 6, when there is snow on the ground, there is a reception peak of the reflected waves (RWs, RW1 to RW4) from the snow surface and the respective reflectors R1 to R4. The closer to the antenna 10 that these reflected waves have reflected from, the higher their level (reflection amount) will be, and the shorter the return time (electrical distance) to the antenna 10 will also be. Furthermore, these reflected waves have a smaller reflection amount than compared to if there were no snow on the ground (the waveform shown by the dashed line in FIG. 6), and the return time of the reflected waves is also longer (i.e., the time it takes for the radio waves to be received by the antenna 10 via the reflectors after being transmitted from the antenna 10; the same hereinafter). Accordingly, it is possible to measure snow quality at the plurality of prescribed height positions based on the amount of delay in the return time when there is snow on the ground, with the reference being the return time of the respective reflected waves from the plurality of reflectors R1 to R4 when there is no snow on the ground.

The storage unit 42 of the calculation unit 40 has stored therein information such as the height positions of the antenna 10 and reflectors R1 to R4 and the return time of the reflected waves from the respective reflectors when there is no snow on the ground. Accordingly, the measuring device 20 (calculation unit 40) refers to this existing data as reference values, which, as described later, makes it possible to estimate the presence or absence of snow and snow quality at the height positions of the respective reflectors R1 to R4 based on the return time (electrical distance) of the respective reflected waves.

Moreover, the measuring device 20 (calculation unit 40) can measure the depth of the snow S (snow depth) on the ground based on the return time of the reflected waves RWs from the snow surface while using as a reference the return time of the reflected waves RW from the reflector R1 from when there is no snow on the ground. For example, when the return time of the reflected waves RWs is ts(s), then snow depth T(m) (see FIG. 5) is calculated by the formula below:

$$T=T0-c \times ts/2 \quad (4).$$

Next, the measuring method of snow quality (relative permittivity) of the respective snow layers at the height positions of the respective reflectors R1 to R4 will be explained. The calculation of relative permittivity is performed by the snow quality calculation device 41 in the calculation unit 40.

As shown in FIG. 5, the relative permittivity of snow qualities 1 to 4 at the height positions of the reflectors R1 to R4 is shown by ε1 to ε4, respectively. In this example, snow quality 1 corresponds to snow quality of the bottom layer (ground level), and snow quality 4 corresponds to snow quality of the top layer.

First, the relative permittivity ε4 of the snow quality 4 of the top layer is calculated using a similar method to the derivation method of formula (3) above. In other words, when the height of the reflector R4 from the ground is T4(m), and the return time of the reflected wave RW4 via the reflector R4 is t4s(s), then relative permittivity ε4 is expressed as:

$$\varepsilon 4=\{(c \times t4s-2T4)/2T+1\}^2 \quad (5).$$

Next, the calculation method for relative permittivity ε3 of snow quality 3 will be explained. When the height of the reflector R3 from the ground is T3(m), and the return time of the reflected wave RW3 via the reflector R3 is t3s(s), then the round-trip time Δt between the reflector R4 and reflector R3 is expressed as:

$$\Delta t=t3s-t4s=2(T3-T4) \times \sqrt{(\varepsilon 3)}/c.$$

If solving for ε3, then:

$$\varepsilon 3=\{c \times (t3s-t4s)/2(T3-T4)\}^2 \quad (6).$$

In a similar manner for snow quality 2, when the height of the reflector R2 from the ground is T2(m), and the return time of the reflected wave RW2 via the reflector R2 is t2s(s), then the relative permittivity ε2 of snow quality 2 is represented as:

$$\varepsilon 2=\{c \times (t2s-t3s)/2(T2-T3)\}^2 \quad (7).$$

When the height of the reflector R1 from the ground is T1(m) (zero, in this example), and the return time of the reflected wave RW1 via the reflector R1 is t1s(s), then the relative permittivity ε1 of snow quality 1 is expressed as:

$$\varepsilon 1=\{c \times (t1s-t2s)/2(T1-T2)\}^2 \quad (8).$$

As described above, the relative permittivity ε(n) of snow quality for the second layer onwards as counted in the depth direction from the top layer is expressed by the general formula below. This means that the relative permittivity of any layer of snow can be calculated with the same calculation method even if the number of reflectors is five or more.

$$\varepsilon(n)=\{c \times (t(n)s-t(n+b\ 1)s)/2(T(n)-T(n+1))\}^2 \quad (9).$$

As described above, the present embodiment makes it possible to perform unmanned measurement of snow quality for each layer of snow S corresponding to the respective reflectors R1 to R4. This makes it possible to estimate not only snow depth, but also things like the probability of surface avalanches, which can be useful in the issuing of warning information or evacuation information, for example. Furthermore, it is possible to measure the state of the snow remotely, which makes it possible for observation or surveillance of snow quality of a plurality of locations to be concentrated and performed at a single location, for example.

Moreover, in the present embodiment, the snow quality of each layer of snow is measured based on the amount of delay in the return time of the reflected waves RW from the reflectors R to the antenna 10, and thus the present embodiment is more resistant to disruptive external noises as compared to if snow quality were measured by the attenuation of the reflected waves RW or the like; accordingly, it is possible to achieve measurement accuracy.

(Embodiment 2)

Figure 7:
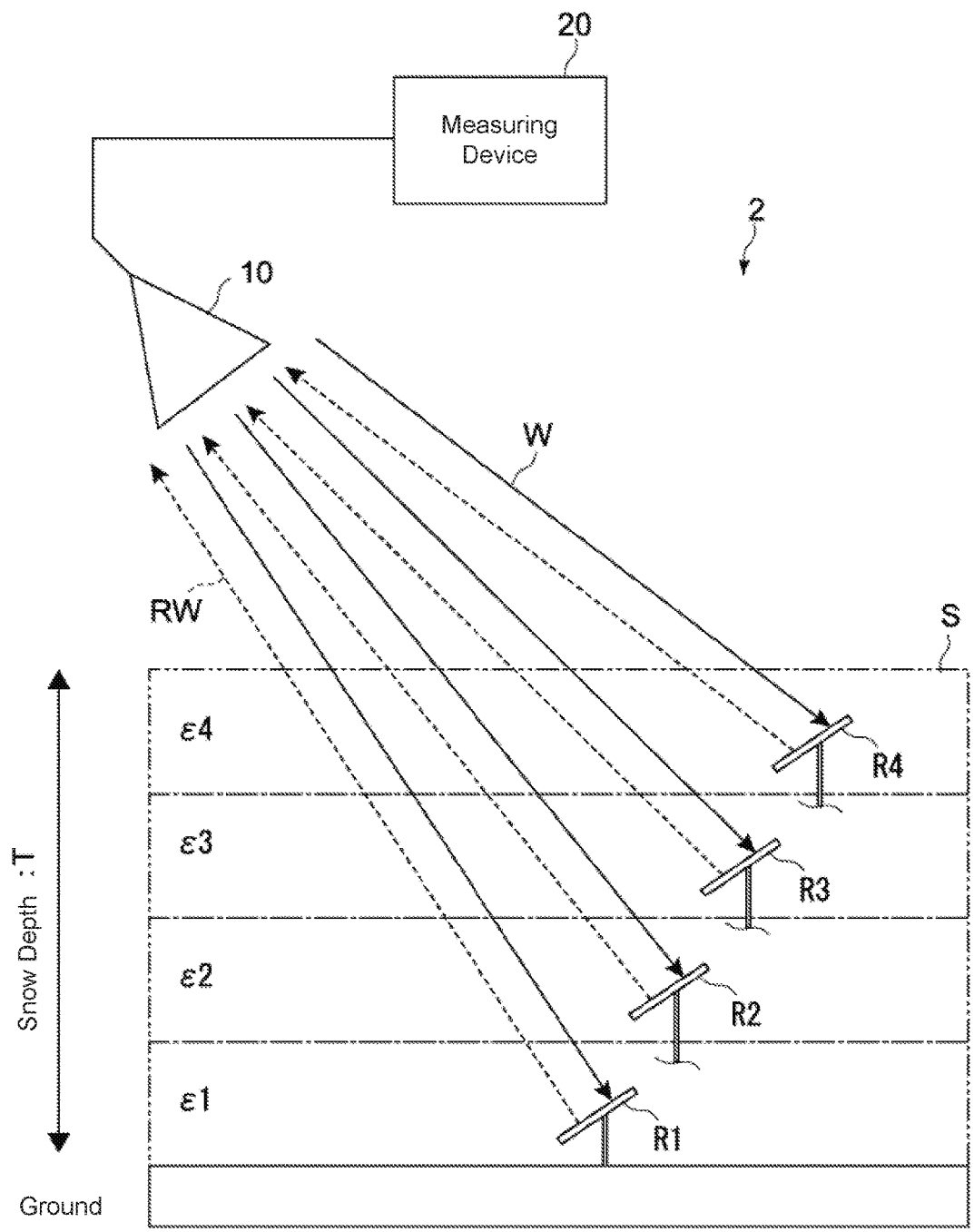
FIG. 7 is a schematic configuration diagram of a snow quality measuring apparatus according to Embodiment 2 of the present invention.

FIG. 7 is a schematic configuration diagram of a snow quality measuring apparatus according to Embodiment 2 of the present invention. The configurations differing from Embodiment 1 will mainly be described below, and the same reference characters will be given to the components that are the same as Embodiment 1 described above; thus, repetitive explanations will be omitted or simplified.

A snow quality measuring apparatus 2 of the present embodiment is similar to Embodiment 1 in having the antenna 10, plurality of reflectors R (R1 to R4), and measuring device 20, but differs from Embodiment 1 in the relative positional relationship between the antenna 10 and the plurality of reflectors R.

In other words, in the snow quality measuring apparatus 2 of the present embodiment, the antenna 10 is not arranged directly over the respective reflectors R1 to R4, and the radio waves W for measurement are emitted to the respective reflectors R1 to R4 in a direction that is slanted with respect to the vertical axis, which makes it possible for the reflected waves RW from the respective reflectors R1 to R4 to be received. The respective reflectors R1 to R4 are arranged at prescribed height positions above the ground, in a similar manner to Embodiment 1, and the radio waves W emitted from the antenna 10 can be reflected back towards the antenna 10.

As above, the snow quality measuring apparatus 2 of the present embodiment measures the snow quality (relative permittivity ε1 to ε4) of the respective layers of snow with the same method as in Embodiment 1. In this way, effects and results similar to Embodiment 1 can be achieved.

In particular, in the present embodiment, the antenna 10 is not positioned directly over the respective reflectors R1 to R4, and thus snow that has accumulated on the antenna 10 will not fall onto the snow S on the ground and cause protrusions or recesses in the surface of the snow; thus, this can reduce deviations in measurement of snow quality or snow depth.

(Embodiment 3)

Figure 8:
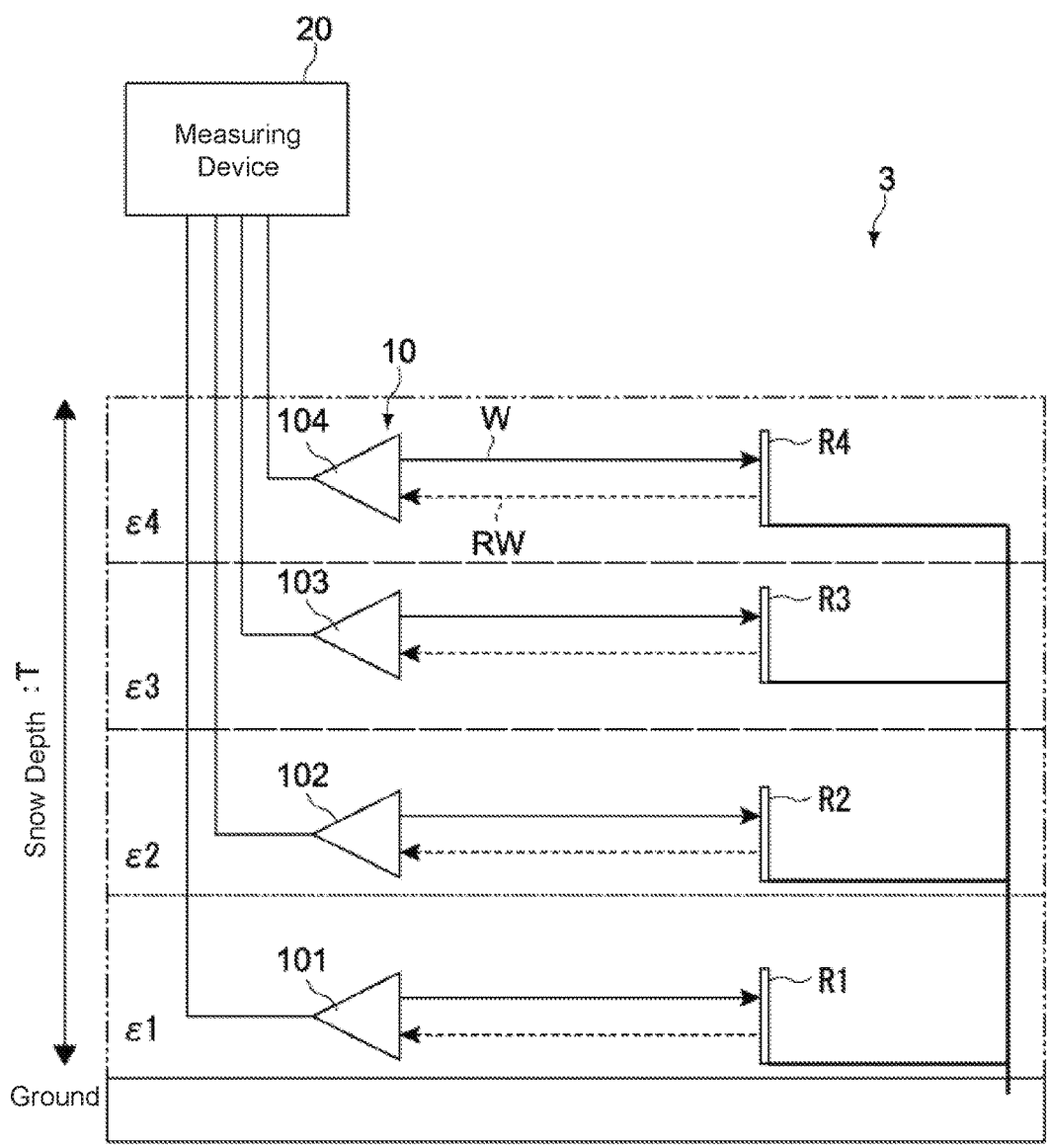
FIG. 8 is a schematic configuration diagram of a snow quality measuring apparatus according to Embodiment 3 of the present invention.

FIG. 8 is a schematic configuration diagram of a snow quality measuring apparatus according to Embodiment 3 of the present invention. The configurations differing from Embodiment 1 will mainly be described below, and the same reference characters will be given to the components that are the same as Embodiment 1 described above; thus, repetitive explanations will be omitted or simplified.

A snow quality measuring apparatus 2 of the present embodiment is similar to Embodiment 1 in having the antenna 10, plurality of reflectors R (R1 to R4), and measuring device (not shown), but differs from Embodiment 1 in the relative positional relationship between the antenna 10 and the plurality of reflectors R.

In other words, in the snow measuring apparatus 3 of the present embodiment, the antenna 10 is constituted by a plurality of transceivers 101 to 104 facing reflectors R1 to R4 that are arranged at a prescribed plurality of height positions. Namely, the transceivers 101 to 104 includes a plurality of transmitters respectively arranged at the prescribed plurality of height positions, and this plurality of transmitters each emits radio waves W for snow quality measurement to the respective plurality of reflectors R1 to R4. Furthermore, the transceivers 101 to 104 include a plurality of receivers that each receive reflected waves RW of the radio waves from the plurality of reflectors R1 to R4. There is no particular limitation to the distance between the transceivers 101 to 104 and reflectors R1 to R4, and the distance is 1 meter or less, for example.

Each of the transceivers 101 to 104 is connected to the measuring device 20 and emits radio waves W to the respective reflectors R1 to R4 opposite thereto, and the reflected waves RW are then received by the transceivers. The emission of radio waves W to the reflectors R1 to R4 may be simultaneous for the transceivers 101 to 104 or not simultaneous. For example, the transceivers 101 to 104 may each transmit and receive radio waves between the corresponding reflectors R1 to R4 in a prescribed later.

The measuring device 20 measures snow quality at the plurality of prescribed height positions based on the amount of delay in the return time when there is snow on the ground, with the reference being the return time of the respective reflected waves RW from the plurality of reflectors R1 to R4 when there is no snow on the ground. The electrical distance of the respective reflected waves from the plurality of reflectors R1 to R4 changes depending on the amount of snow on the ground and snow quality, and the amount of this change manifests itself in the amount of delay in the return time of the respective reflected waves to the transceivers. The amount of delay is closely correlated to the permittivity of the snow covering the respective reflectors, and thus it is possible to identify the quality of the snow on the respective reflectors from the amount of delay.

In the present embodiment, the radio waves W emitted from the respective transceivers 101 to 104 reach the respective reflectors R1 to R4 without going through the plurality of layers of snow and are received by the transceivers 101 to 104; thus, the snow quality of each layer of snow (relative permittivity ε1 to ε4) can be directly measured merely from the amount of delay in the return time when there is no snow on the ground. Accordingly, it is possible to identify the snow quality of each layer of snow with high accuracy.

When the amount of delay in the return time of the reflected waves is zero, it is can determined that the amount of snow accumulated at the height positions is zero, thus making it possible to obtain an estimate regarding snow depth. Alternatively, to measure snow depth, an antenna capable of receiving reflected waves from radio waves emitted to the surface of the snow S may be installed at prescribed heights positions on the ground, in a similar manner to Embodiment 1.

Embodiments of the present invention were described above, but the present invention is not limited to the above-mentioned embodiments, and various modifications can be made.

For example, the transmitters and receivers constituting the transceivers 10 and 101 to 104 may be integrated as a single unit structure, or may be installed physically separate from one another. Furthermore, the plurality of reflectors R may each have the same configuration, or may have different size or shapes depending on the height position thereof.

Moreover, simultaneous implementation of Embodiment 1 and Embodiment 2 described above as a snow quality measuring apparatus makes it possible to further improve measurement accuracy of snow quality and snow depth. It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A snow quality measuring apparatus, comprising:
   a plurality of reflectors respectively installed at a plurality of prescribed heights from the ground;
   at least one transmitter emitting radio waves toward the plurality of reflectors;
   at least one receiver receiving reflected waves of the radio waves from the plurality of reflectors; and
   a measuring device measuring a relative permittivity of snow on the ground representing snow quality for the snow on the ground at each of multiple heights based on the respective reflected waves from two or more of the plurality of reflectors that are buried in the snow as received by the receiver, thereby measuring a layer-by-layer snow quality of the snow.

2. The snow quality measuring apparatus according to claim 1, wherein the measuring device measures the relative permittivity representing the snow quality at said multiple heights based on an amount of delay in a return time of the respective reflected waves from said two or more of the plurality of reflectors when there is snow on the ground, relative to the return time when there is no snow on the ground.

3. The snow quality measuring apparatus according to claim 1,
   wherein said at least one transmitter is a single transmitter installed facing the ground and simultaneously emitting the radio waves to the plurality of reflectors, and
   wherein said at least one receiver is a single receiver receiving all of the reflected waves of the radio waves from the plurality of reflectors.

4. The snow quality measuring apparatus according to claim 2,
wherein said at least one transmitter is a single transmitter installed facing the ground and simultaneously emitting the radio waves to the plurality of reflectors, and
wherein said at least one receiver is a single receiver receiving all of the reflected waves of the radio waves from the plurality of reflectors.

5. The snow quality measuring apparatus according to claim 3,
wherein the plurality of reflectors include a first reflector installed on the ground, and
wherein the measuring device measures a depth of the snow on the ground based on a return time of the reflected waves from a surface of the snow on the ground, relative to a return time of the reflected waves from the first reflector when there is no snow on the ground.

6. The snow quality measuring apparatus according to claim 4,
wherein the plurality of reflectors include a first reflector installed on the ground, and
wherein the measuring device measures a depth of the snow on the ground based on a return time of the reflected waves from a surface of the snow on the ground, relative to a return time of the reflected waves from the first reflector when there is no snow on the ground.

7. The snow quality measuring apparatus according to claim 1,
wherein said at least one transmitter is a plurality of transmitters respectively installed at the plurality of prescribed heights, each emitting the radio waves to the corresponding reflector, and
wherein said at least one receiver is a plurality of receivers each receiving the reflected waves of the radio waves from the corresponding reflector.

8. The snow quality measuring apparatus according to claim 2,
wherein said at least one transmitter is a plurality of transmitters respectively installed at the plurality of prescribed heights, each emitting the radio waves to the corresponding reflector, and
wherein said at least one receiver is a plurality of receivers each receiving the reflected waves of the radio waves from the corresponding reflector.

9. A method of measuring snow quality to be performed by a snow quality measuring apparatus that includes: a plurality of reflectors respectively installed at a plurality of prescribed heights from the ground; at least one transmitter; at least one receiver; and a measuring device, the method, comprising:
causing the at least one transmitter to emit radio waves toward the plurality of reflectors respectively;
causing the at least one receiver to receive reflected radio waves of the radio waves from two or more of the plurality of reflectors that are buried in snow on the ground; and
causing the measuring device to measure a relative permittivity of snow of the ground representing snow quality for the snow on the ground at each of multiple heights based on the received respective reflected waves from said two or more of the plurality of reflectors, thereby measuring a layer-by-layer snow quality of the snow.

* * * * *